(12) United States Patent
Godwin et al.

(10) Patent No.: US 6,993,790 B2
(45) Date of Patent: Jan. 31, 2006

(54) HOST-BASED SYSTEMATIC ATTACK DETECTION TOOL

(75) Inventors: Debbie Ann Godwin, Pflugerville, TX (US); Rodney Eldon Walters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 09/942,552

(22) Filed: Aug. 30, 2001

(65) Prior Publication Data

US 2003/0154396 A1    Aug. 14, 2003

(51) Int. Cl.
G06F 17/00    (2006.01)

(52) U.S. Cl. .................. 726/4; 726/6; 726/8

(58) Field of Classification Search ........... 713/200, 713/150–154, 201–202; 370/401; 709/223
See application file for complete search history.

(56) References Cited

U.S. PATENT DOCUMENTS

| | | | |
|---|---|---|---|
| 5,850,516 A | 12/1998 | Schneier | 395/186 |
| 5,892,903 A | 4/1999 | Klaus | 395/187.01 |
| 6,006,328 A | 12/1999 | Drake | 713/200 |
| 6,088,804 A | 7/2000 | Hill et al. | 713/201 |
| 2002/0031134 A1* | 3/2002 | Poletto et al. | 370/401 |
| 2002/0143917 A1* | 10/2002 | Stevenson et al. | 709/223 |

OTHER PUBLICATIONS

Terry Escamilla, "Intrusion Detection", 1998, Robert Ipsen.*

"Computing the Moving Average of a Sequence", 2000, [Retrieved from Internet Feb. 25, 2005], http://www.cs.mtu.edu/~shene/COURSES/cs201/NOTES/chap08/mov-avg.html.*

Evolving schedule graphs for the vehicle routing problem with time windows Ozdemir, H.T.; Mohan, C.K.;Evolutionary Computation, 2000. Proceedings of the 2000 Congress on vol. 2, Jul. 16-19, 2000 Page(s): 888-895 vol. 2.*

A comparative analysis of HTML and Windows-based multimedia software-an exploratory study Zimmerman, D. E.; Muraski, M.L.; Palmquist, M.E.;Professional Communication Conference, 1996. IPCC '96 Proceedings. 'Communication on the Fast Track'., International.*

Processing reporting function views in a data warehouse environment Lehner, W.; Hummer, W.; Schlesinger, L.; Data Engineering, 2002. Proceedings. 18th International Conference on Feb. 26-Mar. 1, 2002 Page(s): 176-185 Digital Object Identifier 10.1109/ICD.*

* cited by examiner

*Primary Examiner*—David Jung
(74) *Attorney, Agent, or Firm*—Robert H. Frantz; David A. Mims, Jr.

(57) ABSTRACT

A vulnerability checking tool for a host computer designed to examine security logs of attempted logins and revocations, to detect systematic attacks of a wide variety, and to generate a report file that can be examined for information concerning these types of events. Host computer files which contain data regarding attempted accesses and logins are used to create an event list based upon event criteria. The list is evaluated using a "floating period" time frame which advances by single event steps while no violation is detected within a particular floating period, and which advances by "jumps" when violations are detected in a time period so as to reduce the possibility of "over reporting" violations related to the same set of events.

15 Claims, 4 Drawing Sheets

HOST-BASED SYSTEMATIC ATTACK DETECTION TOOL

BACKGROUND OF THE INVENTION

1. Field of the Invention

This invention relates to the arts of networked computer system security, and especially to the arts of detecting and preventing unauthorized access or "log-on" to such computers.

2. Description of the Related Art

Networked computer systems are often provided with remote console or terminal capabilities, be it through a direct data connection or through a network such as a corporate intranet, a dial-up modem, or through the Internet.

The most fundamental form of security for preventing unauthorized remote access to these types of computer systems is a "log-on" or "log-in" procedure during which a remote user provides a user name or ID and a password. The log-on management process, typically provided in the computer system's operating system such as Unix, Linux, Microsoft's Windows [TM] or International Business Machines' (IBM) AIX [TM], checks the supplied user name and password against a registry of known and system users. If the password and user name do not match an entry in the registry, the log-on attempt is denied. The user can then re-attempt the log-on, perhaps he or she incorrectly input their user name or password or is trying one of several possible passwords they believe are correct. Typical log-on management processes will restrict the number of total failed attempts for a given user name, and then will require system administrator intervention to re-enable that user name.

In computer security parlance, "systematic attack" is a term which refers to an attempt to gain access or control of a networked computer through a systematic approach, which is usually automated. In its simplest form, a systematic attack may simply comprise a series of log-in attempts using computer generated user names and passwords in every combination possible, starting with, for example, all possible combinations of 5 characters and numbers (e.g. aaaaa, aaaab, aaaac, . . . 99999), and then progressing to 6 characters and numbers, then 7, etc., until a valid combination is found.

Most corporations who operate networked computer and information systems have established security policies which must be followed in the implementation of such systems in order to protect the assets of the corporation, including but not limited to database contents, e-mail and telephone lists, e-mail engines, web servers and web content, corporate sales and marketing data, and manufacturing information.

These corporate security standards typically apply also to all providers of network and computing services for practices used in and on network and computing environments within the corporation.

According to the security standards and policies used by IBM, Operating System Resources (OSR) file and directory, permissions and owners are verified under their standard, which determines the configuration of the machine and verifies that default shipped passwords have been changed. The standard tool provided by IBM for meeting these requirements or objectives records login failure events when the certain administrator-defined thresholds have been exceeded. For example, an administrator of a particular system may define 5 failures as a threshold to be recorded into a log file. The administrator may later review the log file to determine if there have been patterns of failures that may indicate a systematic attack occurred. This not only can be a time consuming task, but the tedious nature of the task may result in it not being thoroughly and routinely performed, leading to the possibility that systematic attacks are not noticed and appropriate security measures will not be taken.

Similar system administrator tools are used in other corporations for the same purpose, whether they be "third party" tools or proprietary tools.

A systematic attack may also be more sophisticated in its approach to subvert any potential security measures running on the host machine, such as timing the attempts to login to pace them over a period of hours or days to avoid making the attempt obvious to a system administrator by creating too many invalid login attempts in a short time, or by randomizing the combinations tried to avoid creating a more noticeable pattern in the failure log file.

Should a systematic attack be successful in finding a valid user name and password combination, the "user" or "hacker" may gain access to the computer system and proceed to steal corporate information, vandalize application programs and data, and even launch viruses and systematic attacks against other computer systems using the hacked system as a the attacker in order to "cover his or her tracks" (e.g. make it more difficult to find the source of an attack).

For these reasons, a process of controls must be in place for detecting and handling systematic attacks, such as attempts to "logon", to a networked computer. A system security administrator should be notified whenever the number of revokes and invalid logon attempts exceed an installation defined limit, according to most corporate policies.

Therefore, there is a need in the art for a system and method for detecting a systematic attack against a networked computer system. Preferably, this system and method shall provide the following capabilities to a system administrator: Some of the basic requirements of such a systematic attack detector are:

(a) report failed logins and revocation separately;
(b) allow the threshold for failed logins and threshold for revocations to be set by the administrator;
(c) allow a specific time period for failed logins and revocations to be set; and
(d) write or output the results to a report file which may be examined by a system administrator or another process later.

Further, there is a need in the art for this new method and system to be realizable and useful for a variety of operating systems and computer platforms, such as Unix, Linux, IBM AIX [TM], IBM OS/2 [TM], or Microsoft Windows [TM].

SUMMARY OF THE INVENTION

The present invention provides a checking tool for host computers designed to examine security logs of attempted logins and user ID revocations to detect possible systematic attacks of a wide variety, and to generate a report file that can be examined for information concerning these types of events.

The invention accesses host computer system files which contain data regarding attempted accesses and logins, creates an event list based upon event criteria, evaluates the event list to detect possible systematic attacks on the system, and outputs useful information regarding patterns detected in the event list. The invention uses an analysis time frame or "floating period" in which a threshold of events is defined to indicate a security violation. While no violations are detected within a given floating period, it is advanced by one event repeatedly through the event list to look for other possible violations. If a violation is found within a given floating period, it is next "jumped" to begin at the end of the current floating period to avoid allowing events which have already accumulated to a reported violation also accumulating to another violation report, thereby reducing the possibility of "over reporting" violations.

BRIEF DESCRIPTION OF THE DRAWINGS

The following detailed description, when taken in conjunction with the figures presented herein, provides a complete disclosure of the invention.

DETAILED DESCRIPTION OF THE INVENTION

The method of the present invention, referred to as "LogLooker", is preferably realized as software running on a networked computer system having a log file or "audit file" containing time-stamped event information relating to attempted log-ins and revocations. Most operating system which provide a log-in or log-on management process also provide such a log file in the form of a text or binary data file.

According to the preferred embodiment, the invention is realized in "C++" code targeted for use on IBM's AIX operating system on a networked computer such as an IBM-compatible personal computer or an enterprise-class computer. It will be readily recognized by those skilled in the art, though, that the invention is not dependent on use in any particular computer platform or operating system, and as such, it may be realized in alternate programming languages for use with alternate operating systems and computing platforms without departing from the spirit and scope of the invention.

Figure 1:
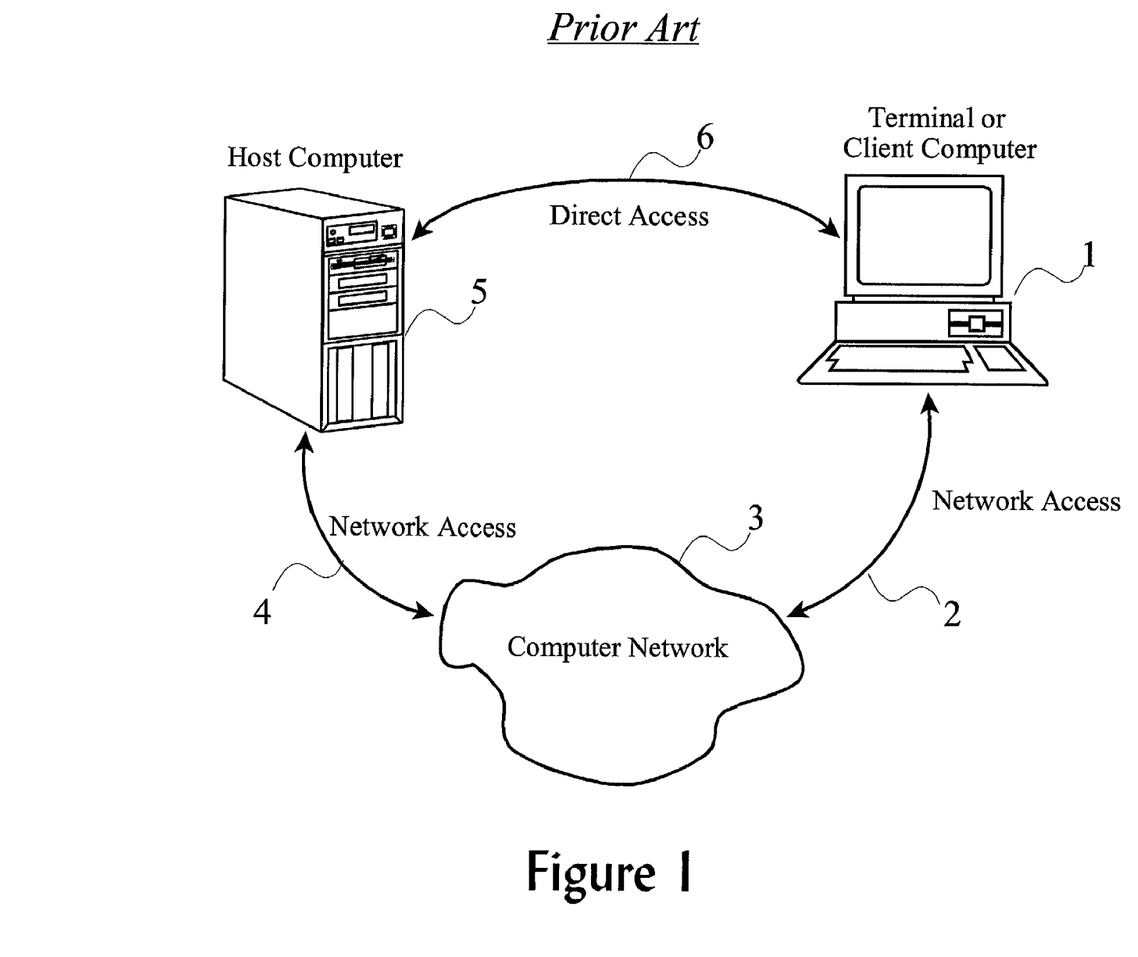
FIG. 1 shows the well known arrangement of remote terminals and client computers with networked host computers and servers.

Remote terminals and client computer arrangements are well-known in the art. FIG. 1 shows a general arrangement of either a Remote Terminal (1) with direct access to a host computer or server (5), or with access through a computer network (3) such as a local area network (LAN), intranet or the Internet. The remote client may also be a computer system itself, such as another peer-level computer to the server or a client such as personal computer running a remote console program. The host computer (5) is typically running an operating system such as Unix, Linux, IBM's AIX [TM] and OS/2 [TM], or Microsoft's Windows NT [TM], or others which are well known. These types of operating system provide from remote user logon to the server to allow a user to utilize the resources of the server.

For the purposes of this disclosure, the following definitions and terms are used. A "threshold" is the minimum number of failed logins or revokes that constitute a security violation. "Scan time" refers to the period of time within a security event log file that LogLooker will examine for violations. The "floating period" is the window of time that is examined within the scan period, as it "floats" along the scan time. A "violation" refers to a condition that exists when the number of login failures or revokes within a single float period meets the threshold.

Table 1 illustrates the content of a typical audit file, including time of each event as well as the user name and password attempted. Such a file may be in a comma separated value (CSV) file, tab delimited data file, or binary format, all of which are well known in the art.

TABLE 1

Example Audit File Contents event number, time,date, user_name, password, result
0,10:00:15,051501,aaaaa, aaaaa, revoke
0,10:00:22,051501,aaaaa, aaaab, revoke
0,10:00:47,051501,aaaaa, aaaac, revoke
...
0,14:02:43,051501,johna, aaaaa, revoke
0,14:02:44,051501,johnb, aaaaa, revoke
0,14:00:15,051501,johnc, aaaaa, revoke
...

The basic method for scanning the events in the audit file are shown in pseudo code in Table 2.

TABLE 2

Pseudo-code for Scanning Method

```
set scan time (e.g. the period of time to be examined for events);
set test criteria for events;
open, read or otherwise receive audit log;
build a list of events based on the criteria including only those events that
    fall within the scan time;
while more events exist in list to be considered
    {
        save current float period starting position in list;
        save last event within current float period;
        while (more events in float period)
            count events;
        endwhile
        if (number of events in float period >= threshold) then
                issue violation message
                    set next_float_start position to position of next event
                        following final event in current float period
            else
                set next_float_start_position to
                    (current_float_start_position + 1)
        endif
    }
    if no violations found but at least one event is recorded in audit file
    then issue warning message;
    if no event found in audit file then issue information message;
    return a value to the calling environment based on what was
        found;
    current_float_start_position = next_float_start_position;
    }
    endwhile
```

A "violation message" is issued when the threshold is exceeded within the floating period for any of the following conditions according to the preferred embodiment:

(a) number failed logins for a given (same) user;

(b) number failed logins for all (different) users;

(c) number of revokes for a given user; and (d) number of revokes for all users.

A "warning message" is issued when any of the following conditions are found:

(e) at least one failed login is detected within the scan time and the number of failed logins does not otherwise constitute a violation; or (f) at least one revoke is detected and the number of revokes does not otherwise constitute a violation.

An "information message" is issued when any of the following conditions are found:

(g) no failed logins are detected; or (h) no revokes are detected.

Additionally, a return value is provided to the calling process (or to the display if manually invoked), preferably having the values as shown in Table 3.

TABLE 3

Return Values

| | |
|---|---|
| −3 | Program abort error after violation occurred. |
| −2 | Program abort error after warning occurred. |
| −1 | Program abort error. |
| +0 | Completed OK. No warnings or violations. |
| +1 | Completed with Warnings. |
| +2 | Completed with Violations. |

The floating period can be thought of as a window of time that is evaluated for login attempt and revoke events. As the audit file is being examined, this window of time will "float" along the timeline of the audit file in discrete steps, producing a span of time to focus on at each step. Only events within the floating period window contribute to a violation determination.

The period of time from the "Start Time" to the "End Time" is the scan time. Login failures or revokes lying outside these time limits are not considered by the invention.

Figure 2:
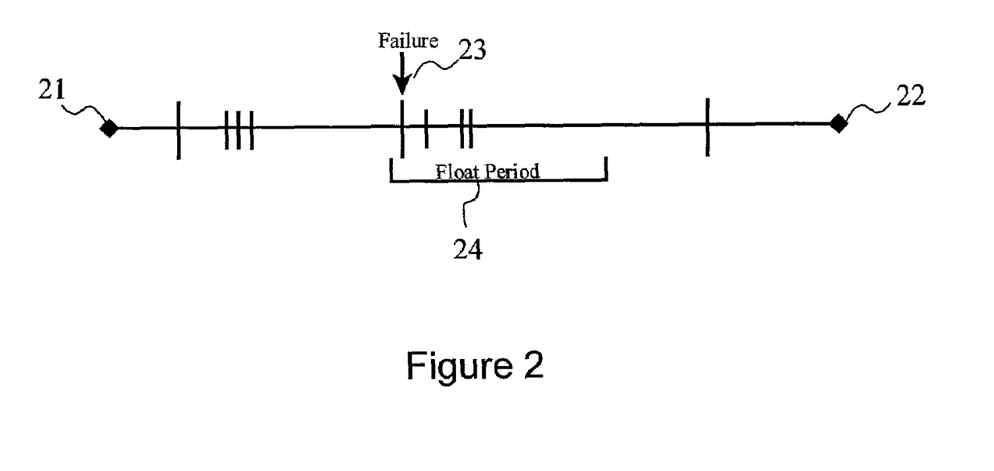
FIG. 2 provides a general illustration of a timeline of events and the floating period of the invention.

FIG. 2 shows an example time line from start time (21) to end time (22), with several events in between including a failure or login revocation (23), and a floating period (24).

If a violation is found within the a given float period, it moves or "floats" to the next event following the end of the current float period so that events already considered and which have already contributed to a violation are not allowed to contribute to another violation. In this scenario, the float period is advanced by a whole float period or more, depending on where the next event is following then end of the current float period. We refer to this type of move of the float period as a "jump".

If no violation is found within the current float period position, the float period is simply advanced to start with the next event following the first event in the current float period (e.g. advanced by one event). We refer to this type of movement as a "single event advancement".

Figure 3:
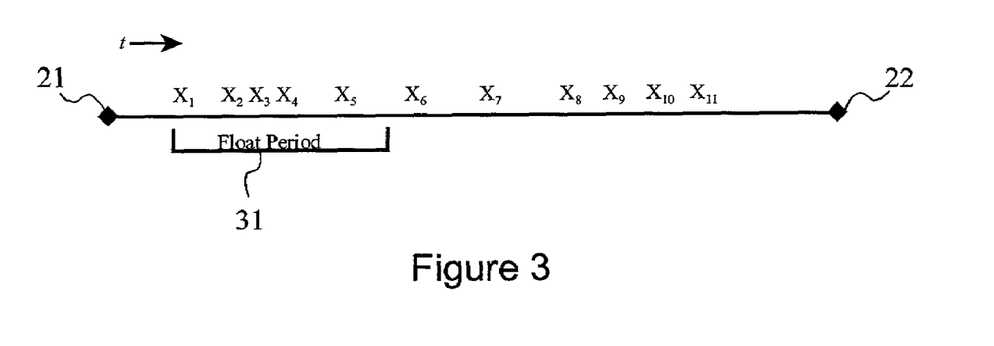
FIGS. 3, 4 and 5 provide an illustration of the movement or behavior of the floating period during analysis of the event list.
Figure 4:
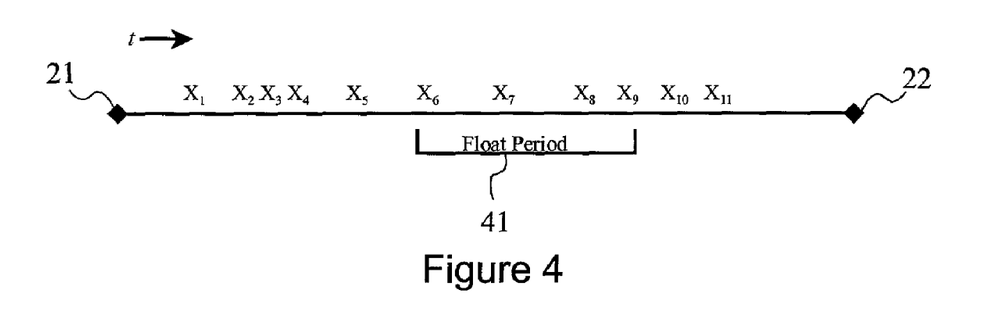
Figure 5:
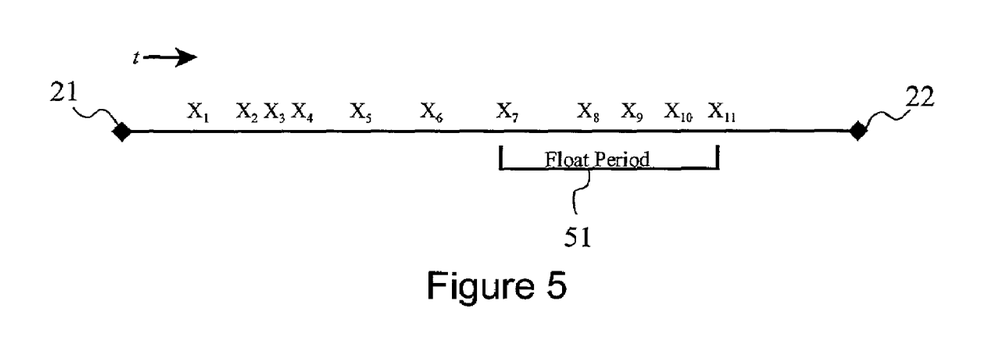

FIGS. 3 through 5 illustrate this behavior, in which $X_n$ represent events such as login failures or revokes, the square bracket encompasses the events within the float period (31), and the horizontal axis represents the scan time from start time (21) to end time (22) with time advancing from left to right.

In this example, it will be assumed that the threshold is set by the tool user to define 5 events as constituting a violation. Turning to FIG. 3, the method starts with the float period (31) initially positioned at the earliest position within the scan time in which the entire float period is within the scan time. In this example, 5 events, $X_1$ through $X_5$, will be counted, which results in a violation being reported by the method.

Next, because a violation was found in this float period (31), the float period is advanced (41) to begin at the next event ($X_6$) following the last event ($X_5$) in the current float period (31), as shown in FIG. 4.

At this position of the float period (41), only four events are found within the float period, so no violation exists or is reported but a warning may be reported since at least one event has been found in this float period.

Because no violation is found within this float period (41), the float period is advanced (51) by one event to begin at the next event $X_7$ following the first event $X_6$ in the current float period (41), as shown in FIG. 5.

In this new position, the float period (51) encompasses 5 events, $X_7$ through $X_{11}$, so another violation is reported. Also in this position, all events in the list have been considered, so the evaluation is complete.

In the above example, two violations would be reported. This example also made no distinction between events generated by different users. In some situations, an attack coming from the same source may attempt to use different user names to login, as well as different passwords, so one type of violation to detect is a threshold of all users within a float period.

In most cases, an audit log contains events from multiple users, so two types of passes may be made through the audit file data. In order to check for total numbers of violations within float times regardless of the user name, the entire audit file is processed as previously discussed. However, in order to count violations for a specific user or set of users, the initial audit file is filtered to remove events which do not pertain to that user or users, and then the method is applied to the filtered audit file.

Alternatively, as each float period is considered, another threshold and count of user-specific failures may be considered. For example, if the total number of failures for any and all users exceeds 10, a violation may be reported. And, if any single user has more than 3 failures during the same float period, a violation may be reported.

According to the preferred embodiment for use in the AIX operating system, the list of revokes (e.g. audit file) may be generated by using both the "failedlogin" and "wtmp" file by performing the following steps:

(1) build a list of failed logins, sorted by time, from the "failedlogin" file located typically at "/etc/security/failedlogin", ignoring events from users who cannot be revoked;

(2) checking the file "wtmp" file (typically located at /var/adm/wtmp) for any successful logins and add those entries to our list, sorted by time, also ignoring any users who cannot be revoked.

At this point, an audit list sorted by time of all the failed and successful logins for users who can be revoked is complete. This temporary list is next used to build a list of revokes by performing the following steps:

(3) Stepping through the login list to find the first or next login failure, and remembering the current position in the list.

(4) Scanning forward looking for more login failures by the same user. For each failure found, a counter is incremented. If the value of the counter equals the "loginretires" threshold allowed for that user, an entry is added to the list of revokes for that user. If a successful login by that user is encountered during the scanning, the counter is reset to zero, and scanning continues.

(5) When the end of the login list is reached, the login list is scanned again for the next user until the list has been processed one time for each user.

At this point, a list of revokes sorted by time is complete, and the method can be applied to the list to find violations. In other operating systems, the audit log may already contain both revoke and failed login events, and as such, this method of generating a list of revokes may be unnecessary.

For alternate embodiments of the invention running under the Linux operating system, the revoke check operates the same as for AIX, except that the Linux log file /var/log/ messages is examined which contain all the needed information. Also, instead of considering the value of "loginretries" on user-by-user basis, the number of failures that constitute a revoke may be fixed at a certain number such as 5.

According to the preferred embodiment, the invention's process may be invoked in two different manners. In the first manner of invocation, the process uses a set of parameters (start time, end time, float period length, number of failures threshold, file locations, etc.) retrieved from a configuration file. This allows an administrator to define one or more configuration files, and to repeat checks based on those configurations. In the second manner of invocation, the process is invoked from a command line using a set of parameters or "command line options", which may be used to override default values and thresholds which are set in a configuration file for the method.

Table 4 shows the command line options of the preferred embodiment of the invention, with some notations for alternate embodiments with alternate operating systems given as well. In this table, each entry for which a "short name" is given, such as a two-letter combination, is a command line option (this allows the command line entry to be less cumbersome). "Long names" are given for the syntax for the configuration file equivalent of the option, which allows for a more descriptive or "readable" entry in the configuration file. For example, the command line syntax for the command to specify the logging level is "ll<level>", and the corresponding configuration file syntax for specifying the logging level is "log_level=<level>".

TABLE 4

Command Line Options of the Preferred Embodiment

| Option | Description |
|---|---|
| h (unix)<br>? (NT or OS/2<br>(none) | Display help for command line options. |
| cfg <file><br>(none) | The fully qualified name of a file containing parameter settings for the program and the checks performed by the program. If not specified the program will look for a file called sad.cfg in the program's directory. If not found, the program will end. If the parameter is specified, the filename value must be provided.<br>Default: sad.cfg |
| ll <level><br>log_level=<level> | Specify the logging level. This controls the amount of output to the error log. Valid levels are 0 through 4.<br>Default: 0 |
| ld<path><br>log_daily=<yes/no> | Add the current day to the name of the error log file. The format for the log file name is YYMM[dd]sad.log, where YY is the last 2 digits of the year, MM is the current month, including a leading 0 for single digit years, dd is the current day, including a leading zero for single digit days. For example, if today were August 9, 2001 the log file name would be 0108sad.log. If ld is specified, the name would be 010809sad.log.<br>Default: no |
| lp <path><br>log_path=<path> | Specify an alternate path for the error log. The default path for this file is the program's directory.<br>Default: same directory as the executable |
| af<audit file><br>audit_file=<fully qualified file name> | Name of an audit file to examine. Note for NT - <audit file> is the fully qualified name of the backup security event log file created from the Event Viewer.<br>Default: /etc/security/failedlogin (AIX) /varlog/messages (Linux) Current security event log for NT or OS/2 |
| suf<su log file><br>sulog_file=<fully qualified file name> | (AIX only) Specify the fully qualified name of an sulog file other than the default/var/adm/sulog. If a user wants to run LogLooker agains log files other than the current, they would specify both a backup failed login file and a backup sulog file.<br>Default: /var/adm/sulog |

TABLE 4-continued

Command Line Options of the Preferred Embodiment

| Option | Description |
| --- | --- |
| ftt<number><br>total_failed_login_threshold=<num> | Minimum number of failed login attempts for all users that constitutes a violation.<br>Default: 20 |
| fut <number><br>failed_login_threshold=<num> | Minimum number of failed login attempts per user that constitutes a violation.<br>Default: 20 |
| rtt <number><br>total_revoke_threshold=<num> | Minimum number of revokes per user that constitutes a violation.<br>Default: 10 |
| rut<number><br>revoke_threshold=<num> | Minimum number of revokes per user that constitutes a violation.<br>Default: 10 |
| lft<minutes><br>failed_login_floattime=<num> | Floating period, in minutes, to be used for the failed login checks (both total and per user).<br>Default: 1440 (24 hours) |
| rft<minutes><br>revoke_floattime=<num> | Floating period, in minutes to be used for the revoke checks (both total and per user).<br>Default: 1440 (24 hours) |
| s<minutes><br>scantime=<minutes> | Scan time, in minutes<br>Default: the time span covered by the audit file |
| e<datetime or 0><br>endtime=<datetime or 0) | Identifies the end datetime for the scanning range. The format of datetime is YYYYMMDD.HHMM. If 0 is specified, the datetime of the last entry in the audit log file is used.<br>Default: the current system time |
| o<path><br>report_dir=<path> | Fully qualified path to place report file. Specify only the path, without the file name (see -f option)<br>Default: /<hostname>LogLooker (unix or \<hostname>\LogLooker (NT and OS/2) |
| f<file name><br>report_file=<file name> | Report file name.<br>Default: YYYYMMDD.sad |
| terse [<level>]<br>terse=<level> | Controls the amount of output to the screen, if screen output is enabled. If the option is specified without a level, it defaults to 3 (most output). Valid levels are 0 through 3.<br>Default: 3 if not specified or if specified without a level |
| nowrap<br>nowrap=<yes/no> | If specified, messages will not be wrapped to fit in the standard width.<br>Default: yes (reports do not wrap) |
| rs<br>report_to_stdout=<yes/no> | Enable report output to the screen (stdout). At least one type of output must be enabled (see rf option).<br>Default: screen output is enabled |
| rf<br>report_to_file=<yes/no> | Enable report output to file. Either screen or file output (or both) must be enabled or an error is generated and LogLooker will terminate.<br>Default: file output is enabled |
| ar<br>append_to_report=<yes/no> | Append output to existing report, if found. Note that a report file will be created if none exists.<br>Default: overwrite existing report |
| rptleve<br>report_level=<a/w/v> | Specifies the level of messages that are output.<br>The valid report level values are:<br>a - Output information messages (along with violations and warnings)<br>w - Show warning messages (along with violations). Informational messages don't display.<br>v - Report only violations (do not report warnings or information).<br>Default: a |

TABLE 4-continued

Command Line Options of the Preferred Embodiment

| Option | Description |
|---|---|
| system <server name><br>system=<server name> | (OS/2 and NT only) Specify a remote system whose audit log is to be examined. The server name is a "UNC" name in the form \\<servername> |
| df<0/1/2><br>date_format=<0/1/2> | (OS/2 only) Specify the date format to apply to audit records. Since administrators can use different date formats for their audit logs, the user must specify a value as follows:<br>0 - use mm/dd/yy format (Default)<br>1 - use dd/mm/yy format<br>2 - use yy/mm/dd format |
| (no command line equivalent)<br>enable_any_login_failure_check<br>enable_user_login_failure_check<br>enable_any_revoke_check<br>enable_user_revoke_check | These options enable or disable a given check, e.g.<br>enable_any_login_failure_check=no disables the failed login check for all users.<br>Important:<br>1. If ITCS204=yest, then all checks are enabled regardless of these settings.<br>2. These options are required. If they are not present LogLooker will report the error and terminate. |

Figure 6:
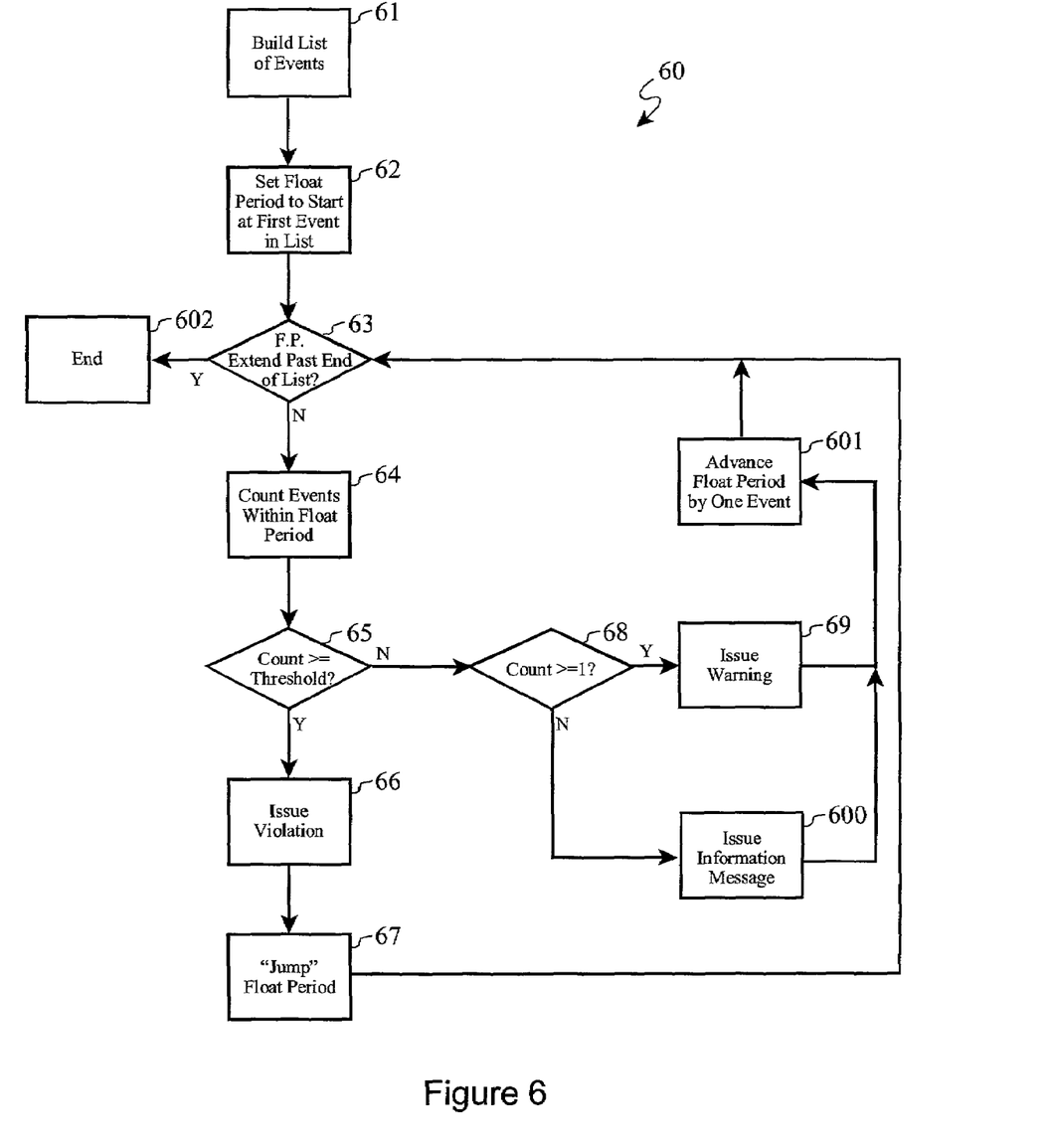
FIG. 6 sets forth the logical process of the invention.

Turning to FIG. 6, the logical process (60) of the invention is shown in a general manner suitable for realization for any operating system. First, a list of events is built (61) containing login failures and user ID revocations, as described previously. Next, the float period (having a user-specified length) is set (62) to start at the first event in the list.

Next, a check (63) is made to make sure that the float period does not extend beyond the end of the list. In this first time through the loop, this condition may be true the separation between the last event in the list and the first event in the list is shorter than the float period (e.g. the float period is set to long or there have been very few failures). If so, the process ends (602).

Normally, though, at this point, the float period will not extend beyond the end of the list of events, so the number of events within the float period are counted (64). If the count exceeds the threshold for a violation (65), then a violation message is issued (66), and the float period is "jumped" (67) to begin at the next event following the last event in the current float period, as described previously. The float period is checked (63) again to make sure that it does not extend beyond the list of events, which if it does, then the entire list has been considered and the process ends (602). Otherwise, processing loops through the counting and message issuance steps again, as shown.

Upon completion of a count (64) of events in a given float period, if the count does not exceed the violation threshold (65) but is equal to or greater than 1 (68), a warning message is issued. If there are no failures in a given float period, then an informational message is issued (600). Following the issuance of a warning or informational message, the float period is advanced (601) by a single event to begin at the next event following the first event in the current float period, as previously described.

Once the float period has been advanced to a position where it extends beyond the end of the list of events, either by single event advancement or by jumping, all events have been considered and processing is complete (63, 602).

Table 5 shows the output report of the preferred embodiment, which includes descriptive information regarding the types of check which generated each set of messages (individual user or system-wide) as well as the scan time, float period length, and threshold values. This report is preferably written to a computer-readable file, such as a "plain text" file, such that it may be printed for visual review, or further processed by additional security analysis tools.

TABLE 5

Output Report of the Preferred Embodiment

```
* Run Date/Time  : Thu May 17 2001 15:32:55
* Hostname       : oursystem
* Version        : 2.1.0
* Platform       : Windows NT
* Description    : Attempt to identify systematic security attacks.
* Tool Invocation : sad
* Config file    : sad.cfg
* Log file       : .\0105sad.log
* Log level      : 0
* Report level   : a
* Report file    : \oursystem\LogLooker\20010517.sad
* ITCS204        : yes
*
Check name      : Login Failure Detection
Check description : This is a check to determine if the total number of
     login failures exceeds a predefined limit.
Violation threshold : 20
Floating time period : 1440 minutes
Scan start timestamp : 05/15/01 17:12:52
Scan stop timestamp : 05/17/01 15:32:55
User ID   Time of event       Hostname
-------   --------------      --------
user5     05/15/01 17:12:52   OURSYSTEM
user5     05/15/01 17:12:54   OURSYSTEM
fsd       05/15/01 17:52:25   OURSYSTEM
ghgf      05/15/01 17:52:28   OURSYSTEM
67tg      05/15/01 17:52:32   OURSYSTEM
```

TABLE 5-continued

Output Report of the Preferred Embodiment

```
user5   05/15/01 17:55:27   OURSYSTEM
user5   05/15/01 17:55:55   OURSYSTEM
...
bob1    05/16/01 14:17:14   OURSYSTEM
george2 05/16/01 14:43:53   OURSYSTEM
*** VIOLATION ***:
    Found 23 login failure(s) between 05/15/01 17:12:52
        and 05/16/01 17:12:52.
rodneyw 05/16/01 19:11:24   SNAPE
---------------------- End of Login Failure Detection --------------------
Check name       : User Logon Failure
Check description : This is a check to determine if the total number of
    logon failures per user exceeds a predefined limit.
Violation threshold : 20
Floating time period : 1440 minutes
Scan start timestamp : 05/15/01 17:12:52
Scan stop timestamp : 05/17/01 15:32:55
User ID  Time of event     Hostname
------------ ---------------------- ----------------
user5   05/15/01 17:12:52   OURSYSTEM
user5   05/15/01 17:12:54   OURSYSTEM
user3   05/15/01 18:17:40   OURSYSTEM
user3   05/15/01 18:17:43   OURSYSTEM
user3   05/15/01 18:17:47   OURSYSTEM
bob1    05/16/01 14:17:14   OURSYSTEM
george2 05/16/01 14:43:53   OURSYSTEM
rodney5 05/16/01 19:11:24   oursystem
<< Warning >> : Login failures have been detected, but have not
    exceeded configured limits.
---------------------- End of User Logon Failure -----------------------
Check name       : Revoke Detection
Check description : This is a check to determine if the total number of
    revokes exceeds a predefined limit.
Violation threshold : 10
Floating time period : 1440 minutes
Scan start timestamp : 05/15/01 17:13:03
Scan stop timestamp : 05/17/01 15:32:56
User ID  Time of event  Hostname
------------ ---------------------- ----------------
user5   05/15/01 17:13:03   OURSYSTEM
user5   05/15/01 17:41:36   OURSYSTEM
user5   05/15/01 17:41:43   OURSYSTEM
...
user3   05/15/01 18:17:50   OURSYSTEM
user3   05/15/01 18:17:59   OURSYSTEM
user3   05/15/01 18:18:06   OURSYSTEM
bob1    05/16/01 14:10:52   \\SYSTEM99
bob1    05/16/01 14:17:02   OURSYSTEM
bob1    05/16/01 14:17:06   OURSYSTEM
*** VIOLATION ***:
    Found 17 revoke(s) between 05/15/01 17:13:03 and
------------------------ End of Revoke Detection ------------------------
* End of report
```

While certain details of the preferred embodiment have been disclosed relative to a given computing platform, it will be readily recognized that certain variations and alternate embodiments may be made without departing from the spirit and scope of the present invention, including but not limited to changes in programming methodology, use of alternate operating systems and computing hardware. Therefore, the scope of the present invention should be determined by the following claims.

What is claimed is:

1. A method for detecting systematic attacks and unauthorized attempts to access a host computer, said host computer having an event list containing time-stamped records for each attempt to login or logon to the host computer, said records including user detail information such as a user name, said event list having an earliest event and a latest event with the time there between being a scan time, said method comprising the steps of:

establishing a float period length having a finite time duration;

establishing a float period at an initial position, said float period having a start time and an end time, said end time being equal to said start time plus said float period length, wherein said start time is initially equal to a time stamp value of said earliest event in said event list;

counting a number of events in said event list which fall within said current float period;

responsive to said count exceeding a threshold, producing a violation message and jumping said float period by setting said start time to be equal to a time stamp value of an event in said event list immediately following said float period end time, otherwise advancing said float period by a single event by setting said start time to a time stamp value of an event in said event list immediately following said start time; and iterating said steps of counting, producing a violation message and jumping said float period and single-event advancing of said float period until said float period end time exceeds a time stamp value of said latest event in said event list.

2. The method as set forth in claim 1 wherein said step of producing a violation message comprises creating a report viewable by a system administrator.

3. The method as set forth in claim 1 wherein said step of advancing by a single-event the float period further comprises producing a warning message if said count is equal to or greater than 1.

4. The method as set forth in claim 1 further comprising a step of producing said event list by accessing at least one host computer system audit file containing said events, extracting said events from said audit file, and producing said event list.

5. The method as set forth in claim 1 wherein said step of counting a number of events in said event list comprises counting only events for a single user.

6. A computer readable medium encoded with software for detecting systematic attacks and unauthorized attempts to access a host computer, said host computer having an event list containing time-stamped records for each attempt to login or logon to the host computer, said records including user detail information such as a user name, said event list having an earliest event and a latest event with the time there between being a scan time, said causing said host computer to perform the steps of:

establishing a float period length having a finite time duration;

establishing a float period at an initial position, said float period having a start time and an end time, said end time being equal to said start time plus said float period length, wherein said start time is initially equal to a time stamp value of said earliest event in said event list;

counting a number of events in said event list which fall within said current float period;

responsive to said count exceeding a threshold, producing a violation message and jumping said float period by setting said start time to be equal to a time stamp value of an event in said event list immediately following said float period end time, otherwise advancing said float period by a single event by setting said start time to a time stamp value of an event in said event list immediately following said start time; and iterating said steps of counting, producing a violation message and jumping said float period and single-event advancing of said float period until said float period end time exceeds a time stamp value of said latest event in said event list.

7. The computer readable medium as set forth in claim 6 wherein said software for producing a violation message comprises software for creating a report viewable by a system administrator.

8. The computer readable medium as set forth in claim 6 wherein said software for advancing by a single-event the float period further comprises software for producing a warning message if said count is equal to or greater than 1.

9. The computer readable medium as set forth in claim 6 further comprising software for producing said event list by accessing at least one host computer system audit file containing said events, extracting said events from said audit file, and producing said event list.

10. The computer readable medium as set forth in claim 6 wherein said software for counting a number of events in said event list comprises software for counting only events for a single user.

11. A system for detecting systematic attacks against a host computer by analyzing an event list of attempted log-ons and accesses, said event list having a plurality of events comprised of time stamps and user names, said event list having an earliest event and a latest event, said system comprising:

a float period manager for advancing a float period from an initial position to a plurality of subsequent positions, said initial position having a float period start time equivalent to said earliest event time stamp and a float period end time equal to said start time plus a float period length, said float period being adapted to jump the float period to a subsequent position such that said start time is equivalent to a time stamp of an immediately subsequent event following said end time, and also being adapted to advance said float period to a subsequent position by a single event such that said start time is equivalent to a time stamp of an immediately subsequent event following said start time;

an event counter for determining an event count within a given position of said float period; and an evaluator for comparing said event count to a violation threshold, and responsive to said count exceeding said threshold, producing a violation message and causing said float period manager to jump said float period to a subsequent position, otherwise causing said float period manager to advance said float period by a single-event to a subsequent position, until said float period end time exceeds a time stamp of said latest event in the event list.

12. The system as set forth in claim 11 wherein said event counter is adapted to count events associated with a single user.

13. The system as set forth in claim 11 wherein said evaluator is adapted to produce a report viewable by a system administrator.

14. The system as set forth in claim 11 wherein said evaluator is adapted to produce a warning message if said event count exceeds 1 and is less than or equal to said violation threshold.

15. The system as set forth in claim 11 further comprising an event list producer for producing said event list from one or more audit files.

* * * * *